C. L. HOBBS.
SUPPLEMENTAL HOOD FOR AUTOMOBILES.
APPLICATION FILED FEB. 14, 1908.

901,616.

Patented Oct. 20, 1908.

2 SHEETS—SHEET 1.

Witnesses:
John Enders
Chas H. Buell

Inventor:
Charles L. Hobbs.
By Sheridan & Wilkinson,
Attys.

C. L. HOBBS.
SUPPLEMENTAL HOOD FOR AUTOMOBILES.
APPLICATION FILED FEB. 14, 1908.
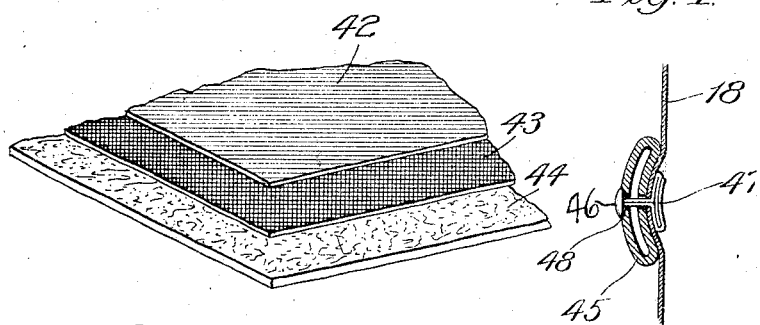
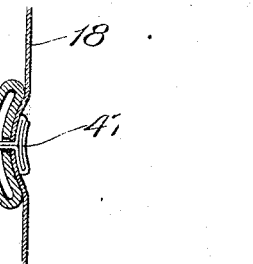
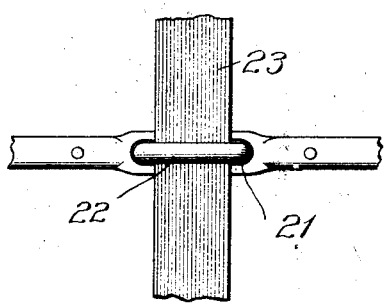
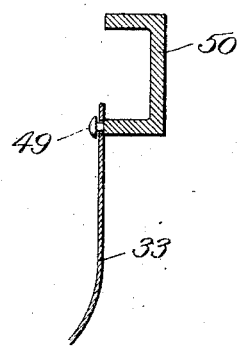
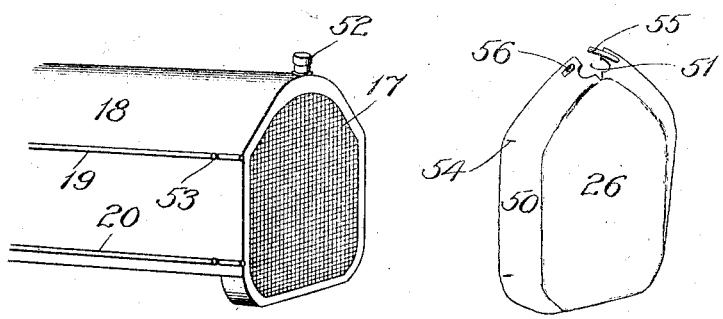

UNITED STATES PATENT OFFICE.

CHARLES L. HOBBS, OF CHICAGO, ILLINOIS.

SUPPLEMENTAL HOOD FOR AUTOMOBILES.

No. 901,616.  Specification of Letters Patent.  Patented Oct. 20, 1908.

Application filed February 14, 1908. Serial No. 415,807.

*To all whom it may concern:*

Be it known that I, CHARLES L. HOBBS, a citizen of the United States, residing at Chicago, in the county of Cook and State of Illinois, have invented certain new and useful Improvements in Supplemental Hoods for Automobiles, of which the following is a specification.

Considerable difficulties have been experienced with gasolene automobiles in cold weather due to the fact that when they are left standing idle for a time they cool off to such an extent that they will not start up readily. When it is extremely cold or when they are left standing for a long time in freezing temperature it may be that the water which circulates through the cylinder jackets and radiator, for the purpose of cooling the former, will freeze. Moreover, the full power of the gasolene engine is developed only after the engine has attained a certain degree of heat, so that there is a gain in effectiveness if the engine can be kept from cooling too much.

My invention is intended to obviate these difficulties and it consists broadly in the provision of means to retain the heat of the engine and water circulating system so as to prevent its escape and the consequent lowering of temperature when the automobile is standing idle.

With my invention it is perfectly practicable to keep the temperature of the parts referred to up to a point that facilitates starting after any ordinary stop of the automobile. It is even possible to retain the heat in the water circulating system and the other parts under the automobile hood all night long, so that after an automobile is run into the garage in the evening it may be taken out the following morning and started up without delay or difficulty.

Figure 1:
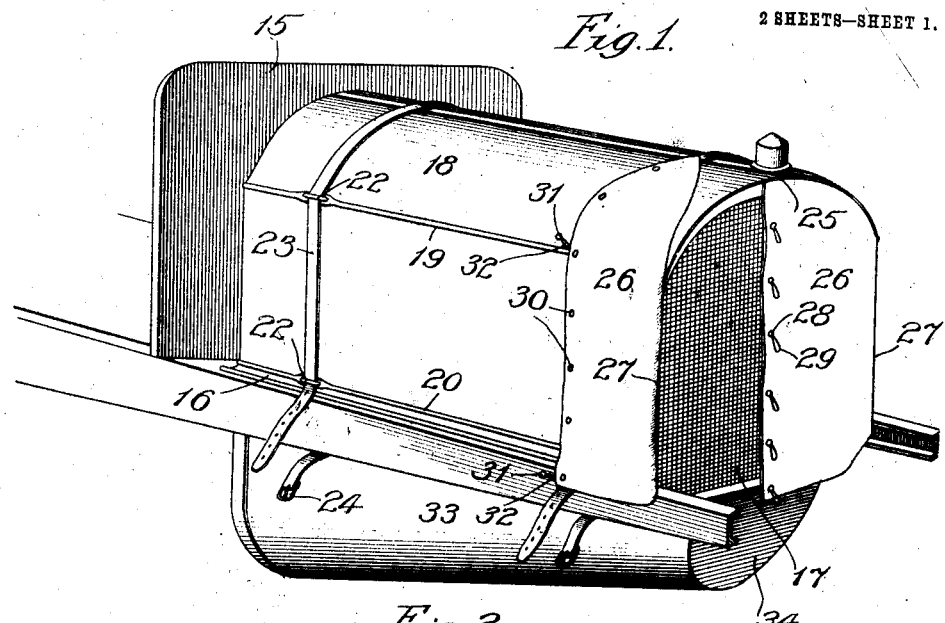
Figure 2:
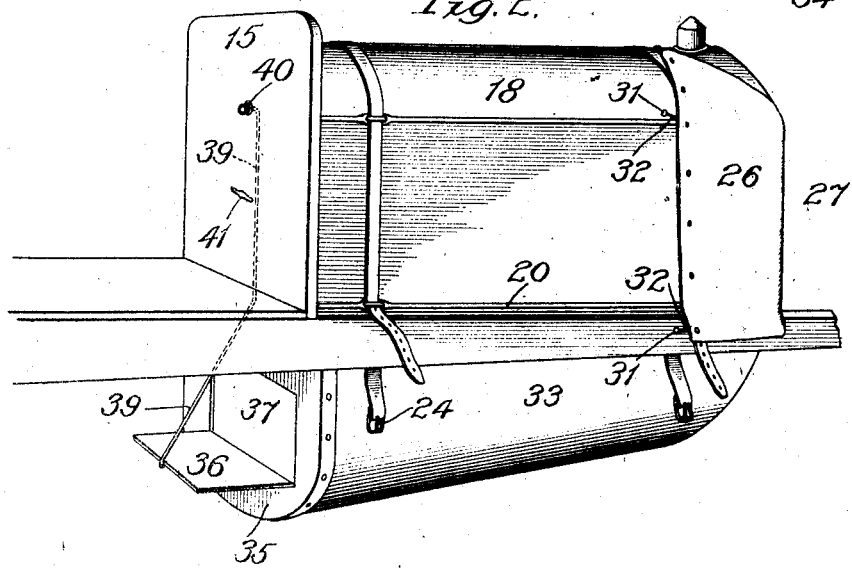

Referring to the drawings—Figure 1 is a perspective view of the front of an automobile showing my invention applied thereto. Fig. 2 is a perspective view of the same parts from a different angle. Figs. 3, 4, 5 and 6 illustrate details of the invention. Fig. 7 is a perspective view of a modification of a detail.

The dash-board in front of the operator of the automobile is represented by the reference numeral 15. The engine and other pieces of apparatus are in front of this dash-board and are covered by a removable sheet metal hood 16. At the front end of this hood is the radiator 17 through which the cooling water circulates in circuit with the water jackets of the engine cylinders. All these parts are old and are here mentioned merely in order to show how my invention is applied.

I provide a flexible heat insulating covering 18, which is adapted to fit over the hood 16. This is stiffened in a longitudinal direction by means of the intermediate rods 19 and the edge rods 20. Holes 21 are provided preferably in the rods 19 and 20, corresponding to staples 22 on the automobile hood and when the supplemental hood 18 is applied, a strap 23 of leather or other suitable material is slipped through the staples 22 as they project through the holes 21, thus securing the auxiliary hood 18 to the main hood 16. These rods 19 and 20 cause the flexible covering to conform in shape to the main hood when held down thereto by the straps of leather 23 or their equivalent, passing over the rods and under the staples 22. A perfect fit between the metal hood and the auxiliary hood is thus secured. As a further means of securing the strap 23 in place, buckles 24 are provided to which the ends of the strap may be attached. At the front end, the auxiliary hood 18 is designated by the reference numeral 25. Flexibly attached to the front end of the supplemental hood at its sides, as indicated by the reference numerals 27, are the two flaps 26 which may be turned in over the front of the radiator or may be turned back against the sides of the hood. Their upper edges fit in snugly under the edge 25 when they are closed. A row of buttons 28 is provided along the edge of one flap 26 and loops 29 extend from these buttons. Corresponding buttons 30 are arranged along the edge of the other flap so that when the two flaps 26 are closed across the front of the radiator the loops 29 may be made to engage the buttons 30 and hold the flaps in place. On each side of the supplemental hood 18, buttons 31 are provided with loops 32 extending therefrom adapted to engage the buttons 28 or 30 on the flaps, when the latter are turned back, and hold them in the desired position.

Directly underneath the main hood 16 and the parts protected thereby, is a shield or apron 33, which arches across downwardly from the framework of the automobile. It is closed in front, as indicated by the reference numeral 34, and behind, as indicated by the reference numeral 35. Along its sides it has button holes which engage buttons 49 (only one of which is shown in Fig. 6) on the inside edges of the frame members 50. Its front edge is brought well forward so as to lap slightly over the lower edge of the front face of the radiator 17. The rear wall 35 has an opening 37 therein which is adapted to be closed by a hinged door 36, normally held open by its gravity, but adapted to be closed in opposition thereto by means of the cord 39 passing through the hole 40 in the dashboard 15. The cord 39 may be held in any desired position by means of the clip 41 and thus hold the door 36 at any desired degree of closure.

As a material for the supplementary hood 18, I prefer to make a flexible covering built up of elements, as illustrated in Fig. 3, wherein 42 is an outer sheath of pantasote or other water-proof material, 43 is a layer of filter paper or other porous paper, which I have found to be a very efficient non-conductor of heat, and 44 is an inner layer of eider-down cloth which is soft and will not mar or abrade the main hood of the automobile. Instead of lining the flaps 26 with eider-down cloth they may preferably be lined with carriage cloth so as to present a neat appearance when turned back against the side of the hood.

As a material for the underlying shield 33, the rear wall 35 and the door 36, I prefer to use sheet asbestos firmly applied between two layers of protecting canvas by means of any suitable cementing substance. The edges of the door should preferably be bound with a thin strip of sheet metal.

For the longitudinal ribs 19 and 20, which serve to hold the supplemental hood in shape, I prefer to take small tubes of brass or other suitable material and collapse them so that the cross section will be as indicated in Fig. 4, wherein 45 represents the wall of the collapsed tube. Then the flexible material 18 of the auxiliary hood may be attached in the trough or depression of the rod 45 by means of fasteners 46 having tongues 47 bent down within the said trough. The heads of the fasteners 46 should be fitted down into countersunk depressions 48.

Only a few words of explanation of the operation of my device will be necessary, for in the main it is obvious. This supplemental hood 18 being attached to the main hood 16 may be turned back therewith and can stay in place in cold weather whether the automobile is running or standing still. It presents no impediment to turning back the main hood when that is desirable in order to get at the apparatus beneath. When the automobile is running and it is desired that air should pass through the radiator 17 in order to cool the water which circulates through the cylinder jackets, then the flaps 26 should be fastened back against the sides of the hood and the hinged closure 36 should be opened wide. When the automobile is to stand for a short length of time the jacketing effect of the hood 18 may be sufficient to prevent extensive radiation of heat. But when the automobile is to stand for a considerable length of time, then the operator should close the hinged door 36 and the front flaps 26, which will completely shut in the engines and the water circulating system and keep them sufficiently hot for a long time.

While I have illustrated my invention as applied to a particular design of automobile, it will be obvious that within the scope of the following claims, and by the mere exercise of ordinary mechanical skill by one familiar with the art, the invention may be adapted to other designs of automobiles. In some cases it may not be necessary to provide the under sheath 33, for the supplemental hood 18 may be sufficient. Its use is not limited to machines employing a water circulating system, but extends to air cooled engines as well. Such modifications and others are intended to be comprehended within the following claims.

Referring to the modification illustrated in Fig. 7, in this case the supplemental hood 18 does not extend beyond the front of the radiator, and the front 26 is entirely detachable therefrom, having a flange 50 which goes around the edge of the radiator when it is applied thereto. This flange is appropriately notched at 51 whereby it is adapted to fit around the supply connection 52. This notch 51 also facilitates folding the front cover 26 when it is removed from the front of the radiator. Buttons 53 on the hood 18 coact with button holes 54 in the flange 50 to keep the cover 26 in place. A strap 55 and buckle 56 are adapted to go behind the radiator supply connection 52 and thus assist in holding the cover 26 in place.

I claim:

1. A supplemental hood for an automobile hood, consisting of a heat insulating covering adapted to be applied to substantially the entire outer surface of the automobile hood, and detachably connected thereto.

2. A covering for the front of an automobile radiator, consisting of a cover of heat insulating material, adapted to fit across said front or to be displaced therefrom.

3. A supplemental hood for an automobile hood consisting of a flexible covering made up of an outer layer of water proof material, an intermediate layer of heat insulating material, and an inner layer of a soft fabric.

4. A supplemental hood for an automobile hood, consisting of a flexible water-proof heat insulating covering adapted to be applied to the surface of the automobile hood so as to be substantially co-extensive therewith, and adapted to be detachably connected thereto.

5. A supplemental hood for an automobile hood, consisting of a heat insulating covering adapted to be applied to the outer surface of the automobile hood, holes in the supplemental hood, staples on the automobile hood adapted to project through said holes, and a strap adapted to pass through the staples and thus connect the supplemental hood to the automobile hood.

6. A supplemental hood for an automobile hood, consisting of a heat insulating covering adapted to be applied to the outer surface of the automobile hood, longitudinal rods attached to the supplemental hood, and means for detachably connecting the rods to the automobile hood.

7. A supplemental hood having a radiator adjacent thereto consisting of a flexible heat insulating covering adapted to be placed over the outer surface of the hood, and a cover adapted to go across the outer face of the radiator or be displaced therefrom.

8. A supplemental hood for an automobile hood having a radiator at the front thereof, consisting of a flexible heat insulating covering adapted to be placed over the outer surface of the hood, and a flanged closure adapted to be placed across the front face of the radiator with its flanges about the edges thereof, or to be displaced therefrom.

9. A covering for an automobile hood having a radiator adjacent thereto, consisting of flexible heat insulating material extending over substantially the entire outer surface of the automobile hood and the outer surface of the radiator, that part of the covering over the outer surface of the radiator being adapted to be displaced therefrom.

10. As a means for retaining the heat in the engine and associated parts of an automobile, a supplementary heat insulating hood over parts referred to, a cover across the front, an apron underneath, an opening in said apron, and an adjustable closure across the opening.

11. A supplemental hood for an automobile, consisting of a flexible covering adapted to be applied to the outer surface of the automobile hood and having stiffening ribs extending in a longitudinal direction.

12. As a means of retaining the heat within the engine and associated parts of an automobile, a hood over said engine and parts, a displaceable closure to go across the front of the hood, and means for attaching said closure in place.

13. As a means of retaining the heat within the engine and associated parts of an automobile, a hood over said engine and parts, a displaceable closure to go across the front of the hood, a flange on said closure adapted to surround the peripheral surface of the radiator, and means to fasten the cover in place.

CHARLES L. HOBBS.

Witnesses:
 EDYTHE M. ANDERSON,
 ANNA L. SAVOIE.